(12) United States Patent
Ireland

(10) Patent No.: US 8,695,632 B2
(45) Date of Patent: Apr. 15, 2014

(54) UNDERGROUND BRINE GENERATING SYSTEM

(75) Inventor: Steven Ireland, Long Beach, CA (US)

(73) Assignee: Brinemaker, Inc., Signal Hill, CA (US)

(*) Notice: Subject to any disclaimer, the term of this patent is extended or adjusted under 35 U.S.C. 154(b) by 147 days.

(21) Appl. No.: 13/275,971

(22) Filed: Oct. 18, 2011

(65) Prior Publication Data
US 2013/0092287 A1 Apr. 18, 2013

(51) Int. Cl.
- *B65D 47/06* (2006.01)
- *B01F 15/02* (2006.01)
- *B05B 1/14* (2006.01)
- *F16L 41/02* (2006.01)
- *F16L 31/02* (2006.01)

(52) U.S. Cl.
USPC ........ 137/592; 137/561 A; 406/155; 406/181; 422/278; 285/133.11; 220/567.1; 239/565

(58) Field of Classification Search
USPC ............... 137/561 A, 592, 574; 285/131.1, 285/133.11; 220/564, 567.1; 239/565, 566, 239/450; 406/155, 156, 181; 422/278
See application file for complete search history.

(56) References Cited

U.S. PATENT DOCUMENTS

| | | | | |
|---|---|---|---|---|
| 1,728,571 A * | 9/1929 | Mille | ............................ | 110/349 |
| 3,587,975 A * | 6/1971 | Moffett | ..................... | 239/428.5 |
| 4,161,963 A * | 7/1979 | Stevens | ......................... | 137/592 |
| 4,387,020 A * | 6/1983 | Hill | ................. | 210/86 |
| 5,010,910 A * | 4/1991 | Hickey | ............................ | 137/1 |
| 7,150,474 B2 * | 12/2006 | Cary | ............................. | 285/63 |
| 7,803,335 B1 * | 9/2010 | Cope | ............................. | 422/275 |
| 8,561,641 B2 * | 10/2013 | Ogden et al. | .................. | 137/588 |

\* cited by examiner

*Primary Examiner* — Atif Chaudry

(74) *Attorney, Agent, or Firm* — Fulwider Patton LLP

(57) ABSTRACT

A brine generating system is disclosed for use with an underground storage tank, the system including a main salt delivery channel that branches into two horizontal feed lines through a reducer to deliver salt under pressure to the bottom of the storage tank in a generally equal distribution along the tank floor. The salt distribution system can be combined with a water distribution system to ensure delivery of water at the location of the salt deposits along the tank floor.

1 Claim, 2 Drawing Sheets

UNDERGROUND BRINE GENERATING SYSTEM

BACKGROUND

Water softening is a significant concern for many businesses, including hospitals and hotels. Hard water creates problems for the equipment used in these facilities as well as other businesses that require a large supply of soft water. One effect of hard water is that soaps and detergents lose some of their effectiveness. Instead of dissolving completely, soap combines with the minerals to form a coagulated soap curd which can cause problems with film and laundry effectiveness. This can keep dirt trapped in the fibers, and it can stiffen and roughen the towels and sheets that hotels and hospitals need to wash every day.

The solution to the problem is to get rid of the minerals such as calcium and magnesium that is found in hard water. While there are chemical treatments that do this, the most popular answer is a water softener. Water softeners are typically use an ion exchange to remove the minerals from the water using a brine solution to effect the removal. The heart of a water softener is a mineral tank that is filled with small polystyrene beads, also known as resin or zeolite. The beads carry a negative charge. Calcium and magnesium in water both carry positive charges. Thus, these minerals will attach to the beads as the hard water passes through the mineral tank. The brine is saturated with Sodium ions, which also have a positive charge, albeit not as strong as the charge on the calcium and magnesium. When a very strong brine solution is flushed through a tank that has beads already saturated with calcium and magnesium, the sheer volume of the sodium ions is enough to drive the calcium and magnesium ions off the beads. Water softeners have a local brine tank that generates the brine necessary to conduct the water softening for businesses that use a lot of soft water.

In normal operation, hard water moves into the mineral tank and the calcium and magnesium ions move to the beads, replacing sodium ions. The sodium ions from the brine go into the water. Once the beads are saturated with calcium and magnesium, the unit enters a 3-phase regenerating cycle. First, the backwash phase reverses water flow to flush dirt out of the tank. In the recharge phase, the concentrated sodium-rich salt solution is carried from the brine tank through the mineral tank. The sodium collects on the beads, replacing the calcium and magnesium, which go down the drain. Once this phase is over, the mineral tank is flushed of excess brine and the brine tank is refilled.

Brine tanks are usually above ground, but where space is particularly critical underground brine making apparatus can be utilized. However, there are unique challenges to underground brine making systems, namely that it is challenging to ensure complete brine saturation for the entire brine solution. That is, unlike an above ground briner that allows for even salt distribution from a single field point, underground briners do not provide for even salt distribution throughout the horizontal vessel. Salt tends to collect below the point of deposit rather than spreading evenly along the tank bottom surface. When water enters the tank, areas of the lower surface near the ends may have little or no salt present, leading to water with minimal salt saturation. If the vessel does not have salt distributed throughout, this non-saturated water and not brine can enter the outlet collection plenum. The problem then is to ensure that salt and water are distributed evenly and thoroughly so that only brine exits the tank.

SUMMARY OF THE INVENTION

The present invention is a system for an underground brine making tank that includes a header system for distributing salt evenly across the floor of a horizontal underground tank, and a companion water distribution system and delivers water to the salt header locations. The header system has a pressurized main vertical delivery pipe that uses a Y-connector to branch the salt feed horizontally along two distribution conduits. The branches of the Y-connector have diameters that are roughly seventy-five percent of the diameter of the main vertical delivery pipe to maintain adequate pressure in the distribution conduits and resist build-up of salt in the conduits. A companion water header system is located adjacent the salt header system to promote mixing and saturation of the salt and water solution to generate brine.

These, and other features of the invention will best be understood by the following description of the inventor's best known preferred embodiment, along with the accompanying figures.

DETAILED DESCRIPTION OF THE PREFERRED EMBODIMENTS

Figure 1:
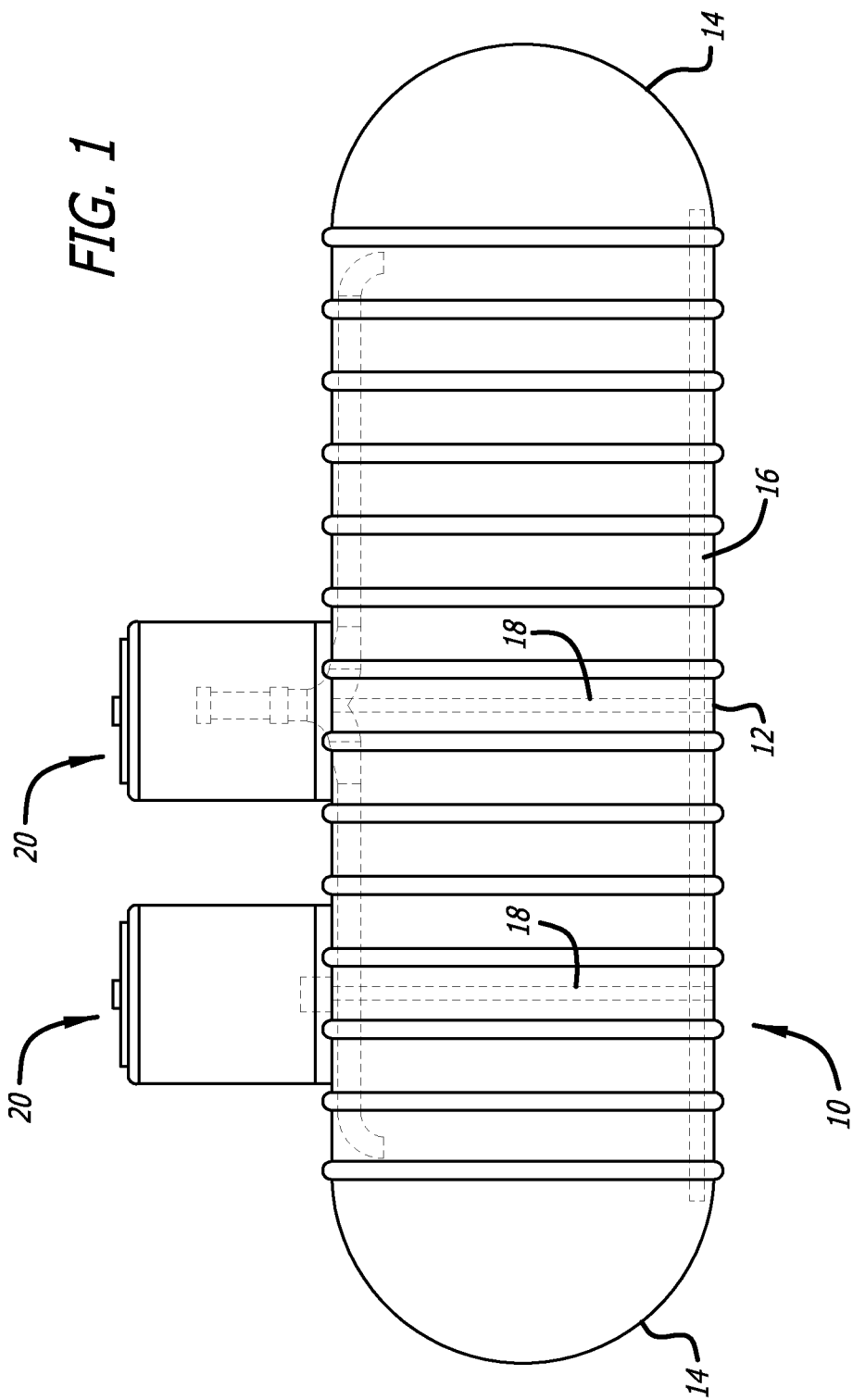
FIG. 1 is a side view, partially in shadow, of an underground tank incorporating the salt distribution system of the present invention.

The present invention is a brine making system that uses a below-ground tank such as that depicted in FIG. 1. The tank 10 is preferably formed with a profile having a stadium shape, that is a cylindrical body 12 with hemispherical end caps 14. Examples of tanks of the kind used with the present invention can be found at http://www.xerxes.com/assets/documents/library/Water-Potable-Brochure.pdf, available from Xerxes Corporation of Minneapolis Minn., the contents of which is fully incorporated herein by reference. The tank 10 is preferably constructed of corrosion-resistant fiberglass reinforced plastic such as terephthalic polyester or highly cross-linked isophthalic polyester resins for the exterior surface and National Sanitation Foundation ("NSF") approved resin for the interior only. The tank 10 is substantially hollow, and preferably complies with all standards for potable water production. All associated internal mounting hardware is preferably rust proof, and all materials are compatible with salt brine. The tank 10 is preferably capable of being buried in ground with up to a seven foot overburden above the top of the tank and be vented to atmospheric pressure. Tanks 10 may be formed with multiple enclosures 20 that house the fittings so that the fittings can be accessed at grade and not below ground, or manways that allow ingress into the tanks The tanks will also preferably include various leak detection equipment and pressurization tubes.

Located on the tank bottom is a brine collection system including a longitudinal plenum 16 extending the length of the tank. The longitudinal plenum 16 may be connected to vertical standpipes 18 through which brine is pumped to external collection vessels outside of the tank 10. Alternatively, the tank can be equipped with plumbing to extract the brine from the bottom of the tank using other means. The exact type of brine retrieval system is not a part of the present invention.

Figure 2:
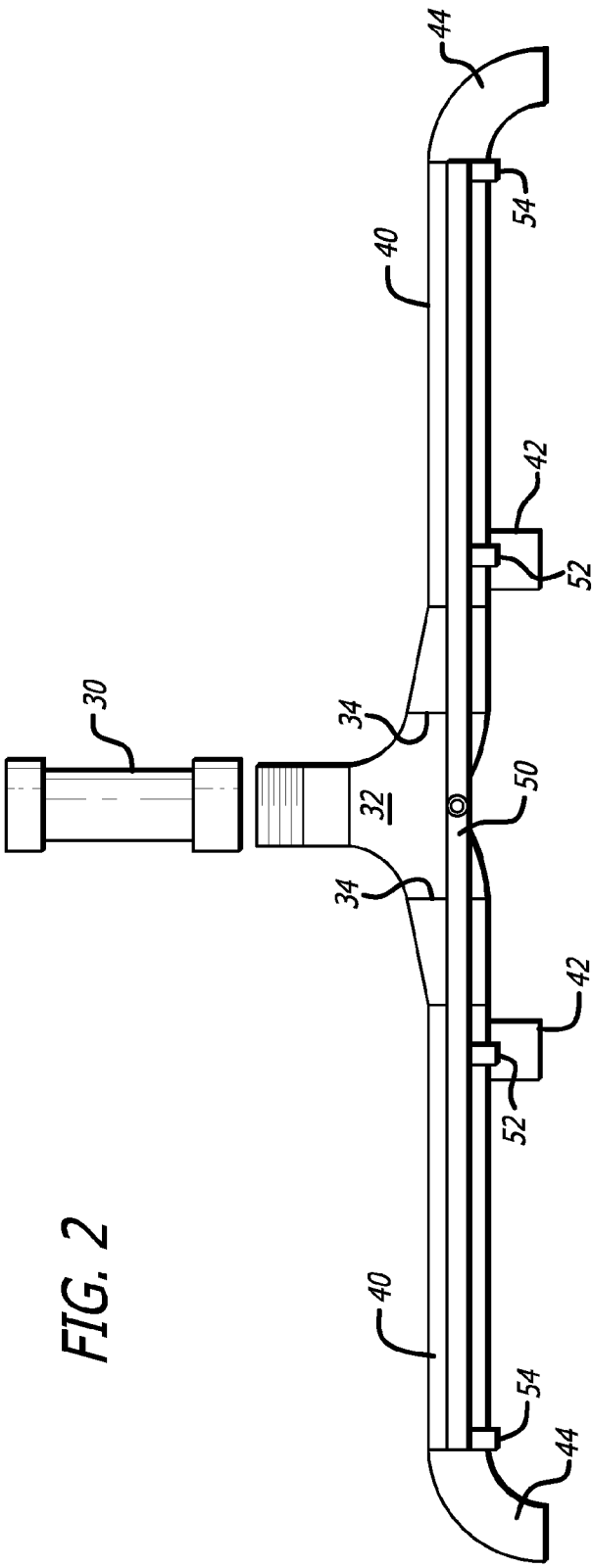
FIG. 2 is a schematic view of a salt distribution header of FIG. 1.

FIG. 2 shows a salt delivery system that establishes an even distribution of salt along the tank floor. With underground brine making tanks, the present solution would be to dump salt directly through an open port, leading to a concentrated pile of salt below the open port and little to no salt at the tank's periphery. This causes water pooled at the ends of the tank to be exposed to less salt and make brine generation in these areas impossible. The present invention solves this dilemma by utilizing a salt distribution system that ensures a proper and even distribution of salt along the tank bottom surface.

The salt distribution system of the present invention has a main vertical channel 30 having an approximate length of thirty inches and an inner diameter of four inches. The upper end of the vertical channel 30 can be connected to a pressurized salt supply source that delivers salt under pressure. The main vertical channel 30 is threaded at its lower end onto a Y-shaped divider 32 that splits the salt passing vertically through the main vertical channel 30 into two horizontal flows through outlets 34. Each outlet 34 is coupled to an eccentric reducer having a ratio of inlet to outlet of approximately 4 to 3. The two eccentric outlets 34 each lead to a horizontal feed pipe 40 with a proximal salt exit port 42 and a distal salt exit port 44. Salt delivered to the tank through the main vertical channel 30 enters the Y-shaped divider 32 and exits the outlets 34 into the horizontal feed pipes 40. The eccentric reducers prevent an undue pressure drop as the flow is split into the two horizontal lines, such that the salt will flow reliably to the end of the distal exit ports 44. A portion of the salt flowing through the horizontal feed pipe 40 exits the flow at proximal exit ports 42 and the remainder of the flow exits the horizontal feed pipe 40 at distal exit 44. The size of the proximal exit ports 42 can be selected so as to ensure the proper distribution of proximal to distal salt delivered for the given system pressure. In a preferred embodiment, the distance between the exit ports is approximately six feet, and the resulting salt distribution system has been tested and shown to deliver an evenly distributed salt layer along the bottom of the tank, ensuring full brine saturation.

The salt distribution system of FIG. 2 can also alternatively be equipped with a water distribution system to deliver a water stream at the salt deposit points. As further shown in FIG. 2, the salt distribution header has a one inch water distribution header 50 into which water is fed from a water supply (not shown). The distribution header 50 has a proximal exit port 52 at each salt proximal exit port 42, and a distal exit port 54 at both salt distal exit ports 44. Using this combined salt and water distribution system, water and salt are supplied at the same positions, further promoting adequate mixing and saturation of the water/salt mixture.

I claim:

1. An underground brine generating system, comprising:
an underground fiberglass tank having first and second hemispherical ends and a cylindrical main portion, including a manway that sits above ground;
a water supply external to said underground tank;
a water delivery system within said tank and connected to the water supply, the water delivery system comprising a main water supply line diverging into two horizontal water supply pipes, each water supply pipes including a proximal water exit port and a distal water exit port;
a supply of salt;
a pressurized salt delivery system for delivering salt to the underground tank, the pressurized salt delivery system comprising a vertical channel having a first diameter, the vertical channel accessible from outside the tank to deliver salt therein through, a Y-shaped diverter connected to a lower edge of the vertical channel, the Y-shaped diverter distributing the salt from the vertical channel into two substantially horizontal flows, a pair of eccentric reducers each connected to an outlet of the Y-shaped diverter, the reducers having an inlet diameter approximately equal to the first diameter and an exit diameter equal to a second diameter, where the second diameter is smaller than the first diameter, a pair of horizontal feed pipes each connected to one of the outlet of the reducers, the horizontal feed pipes each having a proximal salt exit port and a distal salt exit port for delivering salt to a floor of the tank wherein the proximal water exit ports coincide with the proximal salt exit ports, and the distal water exit ports coincide with the distal salt exit ports;
a brine recovery system disposed at the bottom of the underground tank, the brine recovery system including a longitudinal plenum at the bottom of the underground tank, and a plurality of vertical standpipes connected to the plenum to an exterior of the underground tank, the vertical standpipes accessible above ground and through which the brine is pumped out of the underground tank; and
a quantity of brine substantially evenly distributed at the bottom of the underground tank.

* * * * *